United States Patent
Nguyen et al.

(10) Patent No.: US 11,248,585 B2
(45) Date of Patent: Feb. 15, 2022

(54) METHOD FOR ACQUIRING AND MODELLING AN INCIDENT WIND FIELD BY MEANS OF A LIDAR SENSOR

(71) Applicant: IFP Energies nouvelles, Rueil-Malmaison (FR)

(72) Inventors: Hoai-Nam Nguyen, Lyons (FR); Fabrice Guillemin, Saint Germain en Laye (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 203 days.

(21) Appl. No.: 16/621,450

(22) PCT Filed: Jun. 20, 2018

(86) PCT No.: PCT/EP2018/066478
§ 371 (c)(1),
(2) Date: Dec. 11, 2019

(87) PCT Pub. No.: WO2018/234409
PCT Pub. Date: Dec. 27, 2018

(65) Prior Publication Data
US 2020/0124026 A1 Apr. 23, 2020

(30) Foreign Application Priority Data
Jun. 21, 2017 (FR) .................................. 17/55.675

(51) Int. Cl.
*F03D 7/04* (2006.01)
*G01S 17/95* (2006.01)
(Continued)

(52) U.S. Cl.
CPC .............. *F03D 7/045* (2013.01); *G01S 17/95* (2013.01); *F05B 2200/11* (2013.01);
(Continued)

(58) Field of Classification Search
CPC ................. F03D 7/045; F05B 2200/11; F05B 2200/261; F05B 2200/262; F05B 2260/84; F05B 2270/404; G01S 17/95
See application file for complete search history.

(56) References Cited

U.S. PATENT DOCUMENTS

| | | | |
|---|---|---|---|
| 2013/0094961 A1* | 4/2013 | Couchman | F03D 17/00 416/1 |
| 2013/0314694 A1* | 11/2013 | Tchoryk, Jr | G01N 21/538 356/28.5 |
| 2020/0166650 A1* | 5/2020 | Guillemin | F03D 17/00 |

OTHER PUBLICATIONS

LiDAR Data Accuracy: the Impact of Pulse Repetition Rate; by Nora Csanyi et al., presented at the MAPPS/ASPRS 2006 Fall Conference Nov. 6-10, 2006 San Antonio, Texas; 8 pages; printed from the Internet on Sep. 10, 2021; published 2006.*

(Continued)

*Primary Examiner* — Ronald D Hartman, Jr.
(74) *Attorney, Agent, or Firm* — Fitch, Even, Tabin & Flannery LLP

(57) ABSTRACT

The invention relates to a method for acquisition and modelling of an incident wind field by a LiDAR sensor. Acquisition and modelling include a step of estimating the wind amplitudes and directions for a set of discretized points, and a step of incident wind field reconstruction in three dimensions and in real time. The invention also relates to a method of controlling and/or monitoring a wind turbine equipped with such a LiDAR sensor from the incident wind field reconstructed in three dimensions and in real time.

14 Claims, 3 Drawing Sheets

(52) U.S. Cl.
CPC ... *F05B 2200/261* (2013.01); *F05B 2200/262* (2013.01); *F05B 2260/84* (2013.01); *F05B 2270/404* (2013.01)

(56) References Cited

OTHER PUBLICATIONS

Nacelle LiDAR online wind field reconstruction applied to feedforward pitch control; 12 pages; by Guillemin et al., presented in The Science of Making Torque from Wind (TORQUE 2016); Journal of Physics: Conference Series 753 (2016) 052019; published 2016.*

* cited by examiner

METHOD FOR ACQUIRING AND MODELLING AN INCIDENT WIND FIELD BY MEANS OF A LIDAR SENSOR

CROSS-REFERENCE TO RELATED APPLICATIONS

This application is a U.S. national phase application filed under 35 U.S.C. § 371 of International Application No. PCT/EP2018/066478, filed Jun. 20, 2018, designating the United States, which claims priority from French Patent Application No. 1755675, filed Jun. 21, 2017, the entire content of each of which are hereby incorporated herein by reference.

BACKGROUND OF THE INVENTION

Field of the Invention

The present invention relates to the field of LiDAR (Light Detection And Ranging) sensors used as a remote sensing means for measuring wind speed. It also relates to the field of wind turbines equipped with LiDAR sensors and to the control thereof.

Description of the Prior Art

The performances of LiDAR sensors in terms of measurement accuracy, reliability and availability allow wind state estimations and predictions for a targeted aerosol volume. However, LiDAR sensors have some limitations in terms of data accuracy and availability. On the one hand, they only provide a raw wind measurement, that is a projection of the wind on a measurement axis (also referred to as LASER—Light Amplification by Stimulated Emission of Radiation—beam) and, on the other hand, they only allow access to a limited bandwidth corrupted with the spectral content of the wind. Since the raw measurement is an indirect wind measurement corresponding to the projection of the wind on the axis of a LASER beam, it is then necessary to combine several raw measurements of several beams (or several measurement axes) of distinct directions in order to obtain an accurate estimation of the wind vector.

Such estimations are however not accessible trivially or directly, and they require designing and developing accurate and robust reconstruction algorithms related to the variable signal quality, the sensor geometry and the wind conditions.

Most of the reconstruction methods developed so far are based on the assumption of a homogeneous and stable wind field over the entire rotor swept area, as described in the document: '*A Tutorial on the Dynamics and Control of Wind Turbines and Wind Farms*', in 2009 *American Control Conference. IEEE.* 2009, pp. 2076-2089.

However, this assumption is neither representative nor realistic since the wind speed varies considerably with altitude within the atmospheric boundary layer, with very complicated dynamics.

The publication by P. Towers and B. Ll. Jones, '*Real-Time Wind Field Reconstruction from LiDAR Measurements Using a Dynamic Wind Model and State Estimation*', in *Wind Energy* 19.1 (2016), pp. 133-150", provides an estimation algorithm for reconstructing a wind field. The approach uses an unscented Kalman filter integrating a flow model based on the simplified Navier-Stokes equations. However, this technique provides a two-dimensional (2D) reconstruction of the wind field, at a fixed altitude. Furthermore, the technique as described in this publication rests on an unrealistic assumption according to which all the measurements performed with a LiDAR sensor are available for all the beams, at the same time.

Finally, a reconstruction algorithm is also provided by some LiDAR sensor manufacturers. The principle in this case is to obtain an instantaneous estimation of the wind speed at non-measured points in space, from measurement interpolations. However, in such a case, only an estimation of the wind component in the LiDAR axis can be obtained in real time and online. The longitudinal wind speed and the direction are obtained only on the basis of a moving average, and they are not exploitable for real-time applications.

In the field of wind turbines, the productivity and the maintenance costs thereof greatly depend on the system monitoring capacity, in particular the capacity to exploit relevant wind information. Indeed, the main sources of the damage inflicted on the structure and the elements of the wind turbine are related to the wind conditions involving extreme loads (strong turbulent wind, gusts) and to the fatigue of the materials subjected to vibrational and oscillating phenomena. The latter are generated by the interactions between the wind turbine and the wind field, with notably vibration problems exciting the eigenmodes of the wind turbine. There are some control strategies that are currently implemented, but they have no reliable wind information integrable in the control loop to ensure the planned service life. In some cases, the rotor speed is regulated by the generator torque and the aerodynamic torque (via the blade orientation). In other cases, the wind measurement is not directly used in the control loop, so that the rotor speed is feedback regulated. There may also be an alignment from an anemometer sensor arranged in a turbulent zone (nacelle) and undergoing drifts, which leads to an often misaligned wind turbine.

In all cases, this requires integrating constraints in the wind turbine design, with reinforced structures and an associated additional investment cost, as well as a production loss and associated structure load risks.

SUMMARY OF THE INVENTION

In order to overcome the aforementioned drawbacks, a first aspect of the invention is developing an improved method of estimating the speed and the direction of a wind field in three dimensions (3D) online, in real time, in a volume located upstream from a LiDAR sensor to provide a short-term estimation and prediction of the incident wind field on the LiDAR sensor. A second aspect of the invention aims to use this method and this LiDAR sensor in a wind turbine control strategy so as to have wind turbine rotor load predictions, to detect gusts, turbulences, shear, etc.

The invention therefore relates to a method for incident wind field acquisition and modelling by a LiDAR sensor in a space located upstream from the LiDAR sensor. The method comprises the following steps:

a) gridding the space located upstream from the LiDAR sensor where gridding of the space is carried out with a set of discretize points positioned in a predetermined three-dimensional grid comprised of a set of cells made up of estimation points and measurement points.

The gridding step allows discretizing (or sample) the space upstream from the LiDAR sensor into a three-dimensional grid made up of discretized points and causing these various points discretized into either measurement points or estimation points necessary for the modelling process to coincide. It also allows to position relative to one another the measurement and estimation points and to know the distances between all of these discretized points.

b) measuring the amplitude and the direction of the wind at the different measurement points located in the upstream space and positioned at least at two distinct distances from the LiDAR sensor, along at least three measurement axes.

The measurements performed in this step allow obtaining sufficient and reliable initial data for supplying an algorithm intended to estimate the wind amplitude and direction at the estimation points.

c) estimating the wind amplitude and direction at any time on all of the estimation points, and estimation is achieved through optimization by use of a weighted recursive least-squares method of a cost function J that uses at least the data of the measured points, wind speed spatial coherence data, wind speed temporal coherence data, as well as data qualifying the quality of the measurements performed at the measurement points.

Taking account of these various parameters in an optimized cost function allows access to an estimation of the wind amplitude and direction at each estimation point of the grid.

d) reconstructing, in real time and in a predetermined coordinate system, the incident wind field in three dimensions (3D) from the estimated and measured wind amplitudes and directions for each point.

This step permits 3D reconstruction of the incident wind field in the volume sampled by the three-dimensional grid. This step provides a LiDAR measurement history, which provides knowledge of the past states of the wind field, and it is incorporated into the synthesis of the current and future 3D wind field estimations which allows real-time reconstruction.

The use of an optimization approach with a recursive weighted least squares form allows determination of a complete three-dimensional (3D) image of the incident wind spreading in the space located upstream from the LiDAR sensor.

According to an aspect of the invention, the measurement m of the amplitude and the direction of the wind at a measurement point is given by a relation of the form:

$$m_{j,x}(k) = a_j v_{j,x}(k) + b_j v_{j,y}(k) + c_j v_{j,z}(k)$$

where $v_{j,x}(k)$, $v_{j,y}(k)$, $v_{j,z}(k)$ are values of the wind speed projected onto a coordinate system x, y, z at an initial time (k), and $a_j$, $b_j$, $c_j$ with j=0, 1, 2, 3, 4 are measurement coefficients that are given as:

$$\begin{cases} a_j = \cos(\theta_j), \\ b_j = \sin(\theta_j)\cos(\varphi_j), \\ c_j = \sin(\theta_j)\sin(\varphi_j) \end{cases}$$

where $\theta j, \varphi j$ are the zenith and the azimuth of the measurement axis respectively in a spherical coordinate system.

Thus, the wind vector, at each sampled time, for all of the points in the space, is made up of the three components allowing determination of the complete image in three dimensions. Moreover, selection of the measurement coefficients allows depending only on the beam angles which are not a function of the measurement distances, which facilitates computer programming of cost function J.

According to an aspect of the invention, cost function J at any time (t) is written as follows:

$$J(t) = (\omega(0) - \hat{\omega}(0))^T P_0^{-1}(\omega(0) - \hat{\omega}(0)) + \sum_{j=1}^{t}(\omega(j) - \omega(j-))^T Q^{-1}(\omega(j) - \omega(j-1)) + + \sum_{j=1}^{t}\omega(j)^T C_s^T R_s^{-1} C_s \omega(j) + \sum_{j=1}^{t}(C_m\omega(j) - m_m)^T R_m^{-1}(C_m\omega(j) - m_m(j))$$

where ω is an ordered vector comprised of all the components of the speed at the points in space where the wind is estimated, $\hat{\omega}(0)$ is the estimation of the wind speed at the time 0, $P_0$, Q, $R_s$ and $R_m$ are weighting matrices of suitable dimension, and $C_s$, $C_m$ are matrices accounting for the wind speed and the measurement noises.

Using such a cost function makes possible estimation of the wind speed at an estimation point. Moreover, such a function provides a clear interpretation of weighting matrices $P_0$, Q, $R_s$, and $R_m$.

According to an aspect of the invention, the wind amplitude and direction measurements at the different measurement points are carried out at a sampling rate of at least 0.25 Hz. Using such a sampling frequency range allows obtaining several simultaneous measurements on the same measurement axis while having reliable and accurate measurements.

According to an aspect of the invention, the wind amplitude and direction measurements at the different measurement points are performed at least at two different distances along the measurement axis. Measurements performed at least at two distances permit defining a three-dimensional volume sufficient to encompass the blades of a wind turbine, as described hereafter.

According to an aspect of the invention, the wind amplitude and direction measurements are performed along at least three measurement axes. Having at least three measurement axes enables fine gridding of the upstream space and also permits having a sufficient number of measurements for the wind speed estimation step.

According to an aspect of the invention, the spatial coherence of the wind speed along axes x, y and z of a Cartesian coordinate system is estimated with a formula of the type:

$$C_s \omega \approx 0$$

with:

$$C_s = \begin{bmatrix} C_l \\ C_t \\ C_v \end{bmatrix}$$

where:

$C_l$ characterizes the wind speed variation for an estimation domain along longitudinal axis x;

$C_t$ characterizes the wind speed variation for an estimation domain along lateral axis y; and $C_v$ characterizes the wind speed variation for an estimation domain along vertical axis z.

Such a characterization enables computer coding.

According to an aspect of the invention, the spatial coherence of the wind speed along axes x, y and z of the Cartesian coordinate system is estimated with the following assumptions:
the wind speed variation along longitudinal axis x is low and the partial derivative dv/dx is relatively small along the longitudinal axis;
the wind changes smoothly along lateral axis y and partial derivative $dv_x/dx$ is small along lateral axis y; and
the wind changes with a power law along vertical axis z that is given by:

$$v_l = v_r \left(\frac{z}{z_r}\right)^\alpha$$

where α is a power law exponent, $v_l$ is the longitudinal wind at height Z above ground and $Z_r$ is a reference height.

Such assumptions are realistic, and enable reliable and accurate wind speed estimations.

According to an aspect of the invention, the quality of the measurements performed by the LiDAR sensor is represented by a model of the form:

$$C_m \omega = m_m + \in_m$$

where $\in_m$ describes the measurement noises.

A formulation of this type allows the LiDAR measurement inaccuracies to be taken into account.

According to an aspect of the invention, the estimation of the wind field amplitudes and directions at a time (t) over all of the estimation points is given by the formula as follows:

$$\omega(t) = \omega(t-1) + K(y(t) - C\omega(t-1))$$

The advantage of the previous formula is to connect the wind speed estimations over time for the estimation points.

The invention also relates to a computer program product comprising code instructions which carry out the steps of the acquisition and modelling method described above. The program is executed on a LiDAR processing unit.

The invention also relates to a LiDAR sensor with a memory in which are stored the code instructions of a computer program product as described above, which is designed to execute such a computer program product.

Thus, a LiDAR sensor that executes such a computer program product returns reliable information on an incident wind field in three dimensions and in real time.

One object of the invention also relates to a wind turbine comprising a LiDAR sensor as described above.

According to an aspect of the invention, the LiDAR sensor is positioned on the nacelle of the wind turbine.

Finally, the invention also relates to a method of at least one of controlling and monitoring a wind turbine equipped with a LiDAR sensor and a PLC, comprising the following steps of:
a) developing a feed-forward control strategy for the wind turbine by exploiting the reconstruction of the incident wind field in three dimensions and in real time,
b) a control step including the developed control strategy that controls the angle of the blades or the orientation of the nacelle.

Thus, having sufficiently robust and accurate information on the state of the incident wind approaching the rotor provides a novel control approach, with integration of a dynamic and preventive pre-positioning term. Besides, the capacity to reconstruct online, in real time, an incident wind field approaching the rotor plane opens up many exploitation prospects: wind turbine misalignment quantification, power curve, nacelle transfer function, wind gust detection, load and fatigue risk monitoring and diagnosis, preventive maintenance optimization, resource analysis, production optimization. This then allows increasing the wind turbine efficiency, to reduce the maintenance costs, to increase the life of the components and to reduce the investment costs by optimizing the design.

BRIEF DESCRIPTION OF THE DRAWINGS

Other features and advantages of the method according to the invention will be clear from reading the description hereafter of an embodiment given by way of non-limitative example, with reference to the accompanying drawings wherein.

DETAILED DESCRIPTION OF THE INVENTION

Notations

The following notations are used in the description hereafter:
x, y, z are directions of the three-dimensional coordinate system, with z having the vertical axis and x being the principal direction of the wind;
θ and φ are orientation angles of the LiDAR sensor. These angles are described in FIG. 1 as angle θ is the angle formed by the projection of the measurement angle of the LiDAR onto the plane (y, z) and φ is the angle formed by the projection of the measurement axis of the LiDAR onto a plane containing axis x and the projection of the measurement axis of the LiDAR onto plane (y, z);
m(t) is measurement of the LiDAR sensor at a measurement point;
$v_{j,x}(k)$, $v_{j,y}(k)$, $v_{j,z}(k)$ are projections of the wind speed onto x, y, z;
ω is an ordered vector comprised of all the components of the wind speed at the points in space where the wind is estimated on axes x, y and z of the three-dimensional coordinate system;
$\hat{\omega}(t)$ is the estimation of ω(t) at the time t;
P(t) is the time-varying auxiliary matrix that can be obtained at the time t; and
$P_0$, Q, $R_s$ and $R_m$ are weighting matrices of suitable dimension.

In the rest of the description below, the term "LiDAR" is used to designate a LiDAR sensor.

The invention first relates to a method for incident wind field acquisition and modelling by a LiDAR sensor, in order to estimate the speed and the direction of the wind for a wind field approaching and upstream from the LiDAR, in the most reliable manner possible. This estimation needs to be made online, in real time, for a sampled 3D wind field.

Figure 2:
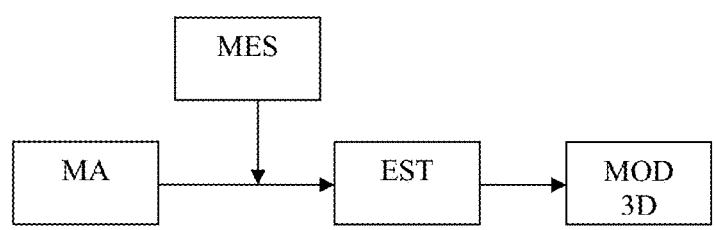
FIG. 2 illustrates the steps of the acquisition and modelling method implemented by the LiDAR sensor according to the invention.

FIG. 2 shows the various steps of the acquisition and modelling method according to the invention:

1. Gridding (MA) the space located upstream from the LiDAR sensor with the grid comprises estimation points (PE) and measurement points (PM).
2. Measuring (MES) the amplitude and the direction of the wind at the different measurement points (PM).
3. Estimating (EST) the amplitude and the direction of the wind at any time (t) at all of the estimation points (PE).
4. Reconstructing (MOD 3D) the incident wind field in three dimensions (3D) and in real time for all of the discretized points.

Figure 1:
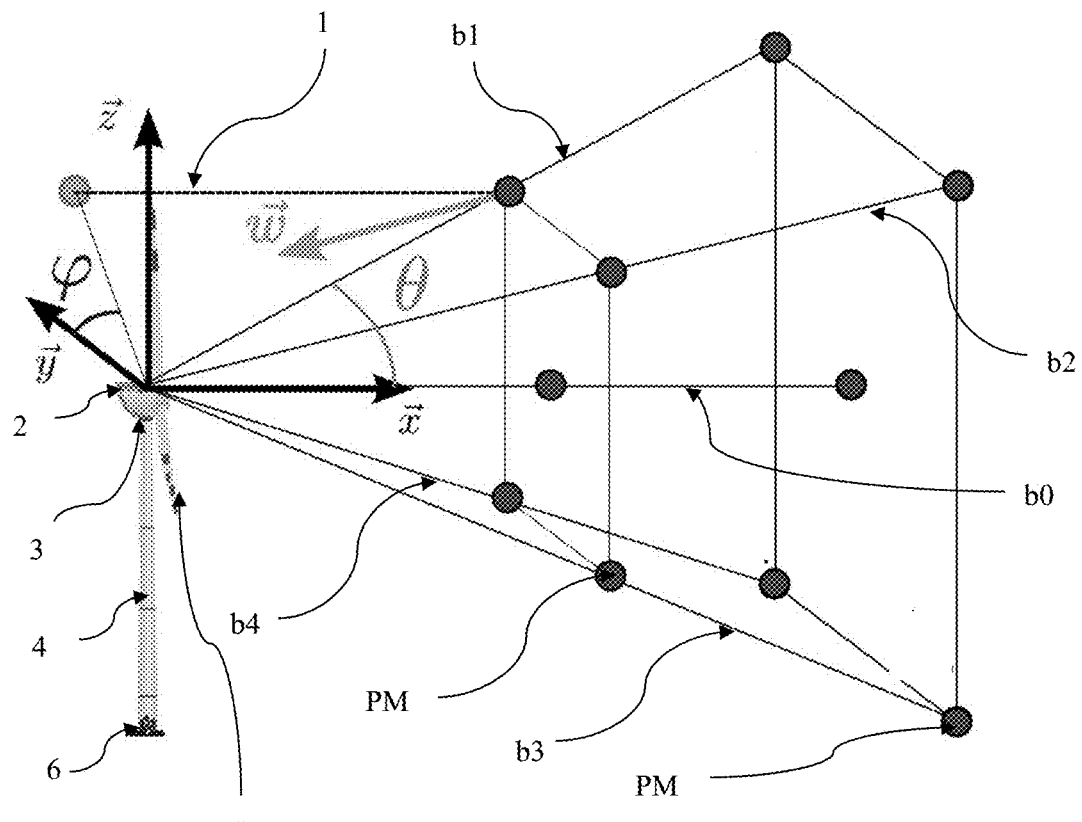
FIG. 1 illustrates a wind turbine equipped with a LiDAR sensor according to the invention.

FIG. 1 shows a wind turbine 1 equipped with a LiDAR sensor 2. LiDAR sensor 2 is used to measure the wind speed at a given distance at a measurement point PM. Knowing the wind measurement in advance a priori allows providing substantial information.

There are several types of LiDAR sensor, for example scanning LiDAR sensors, continuous wave or pulsed LiDARs. Within the context of the invention, a pulsed LiDAR is preferably used. However, the other LiDAR technologies may also be used while remaining within the scope of the invention. As can be seen in FIG. 1, which is an embodiment example, the LiDAR used comprises 5 beams or measurement axes (b0, b1, b2, b3, b4). By way of non-limitative example, the acquisition and modelling method also operates with a LiDAR comprising three beams or more. The 5-beam pulsed LiDAR sensor is mounted on the nacelle 3 of a wind turbine 1.

Conventionally, a wind turbine 1 converts the kinetic energy of the wind into electrical or mechanical energy. To convert the wind energy to electrical energy, it is made up of the following elements:
- a tower 4 allowing a rotor (not shown) to be positioned at a sufficient height to enable motion thereof (necessary for horizontal-axis wind turbines) or this rotor to be positioned at a height enabling it to be driven by a stronger and more regular wind than at ground level 6. Tower 4 generally houses part of the electrical and electronic components (modulator, control, multiplier, generator, etc.),
- a nacelle 3 mounted at the top of tower 4, housing mechanical, pneumatic and some electrical and electronic components (not shown) necessary for operating the machine. Nacelle 3 can rotate to orient the machine in the right direction,
- the rotor, fastened to the nacelle, comprises blades 7 (generally three) and the nose of the wind turbine. The rotor is driven by the energy from the wind and it is connected by a mechanical shaft, directly or indirectly (via a gearbox and mechanical shaft system), to an electrical machine (electrical generator) (not shown) that converts the energy recovered to electrical energy. The rotor is potentially provided with control systems such as variable-angle blades or aerodynamic brakes,
- a transmission made up of two shafts (mechanical shaft of the rotor and mechanical shaft of the electrical machine) connected by a transmission (gearbox) (not shown).

In the description given hereafter, the described acquisition and modelling method is theoretical and it operates independently of wind turbine 1. However, the various examples and developments are given in the case of a LiDAR mounted on nacelle 3 of wind turbine 1 so as to carry out the various steps of the acquisition and modelling method shown in FIG. 2 at a given height with respect to ground level 6.

In this part, the various steps of the acquisition and modelling method according to the invention are described:

1. Gridding (MA) the Space Located Upstream from the LiDAR Sensor

Figure 3:
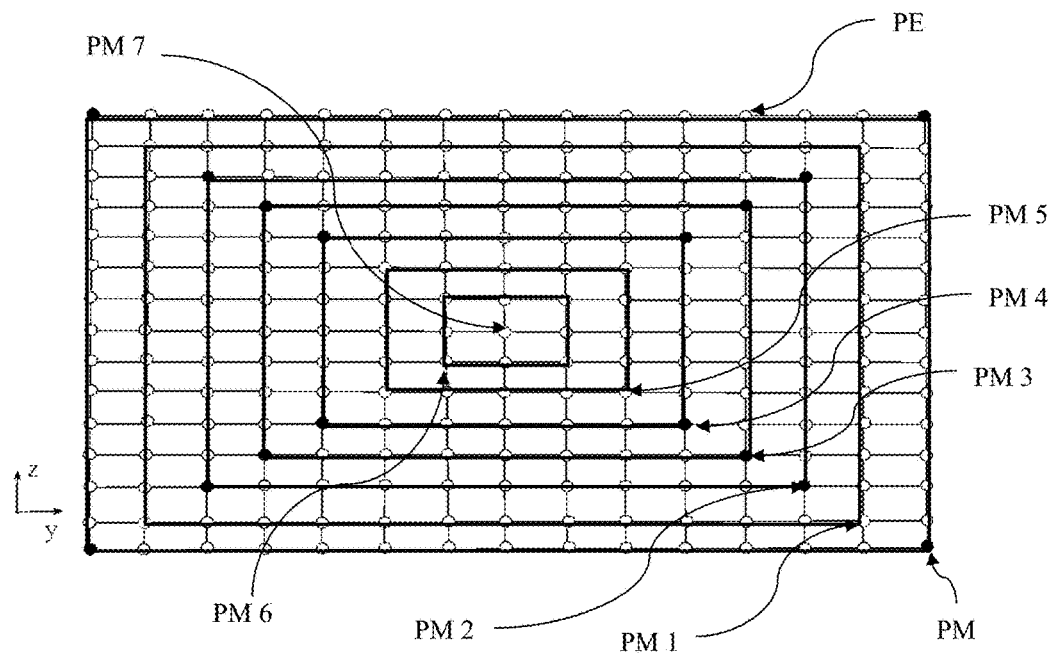
FIG. 3 is a front view of the space grid according to the invention.
Figure 4:
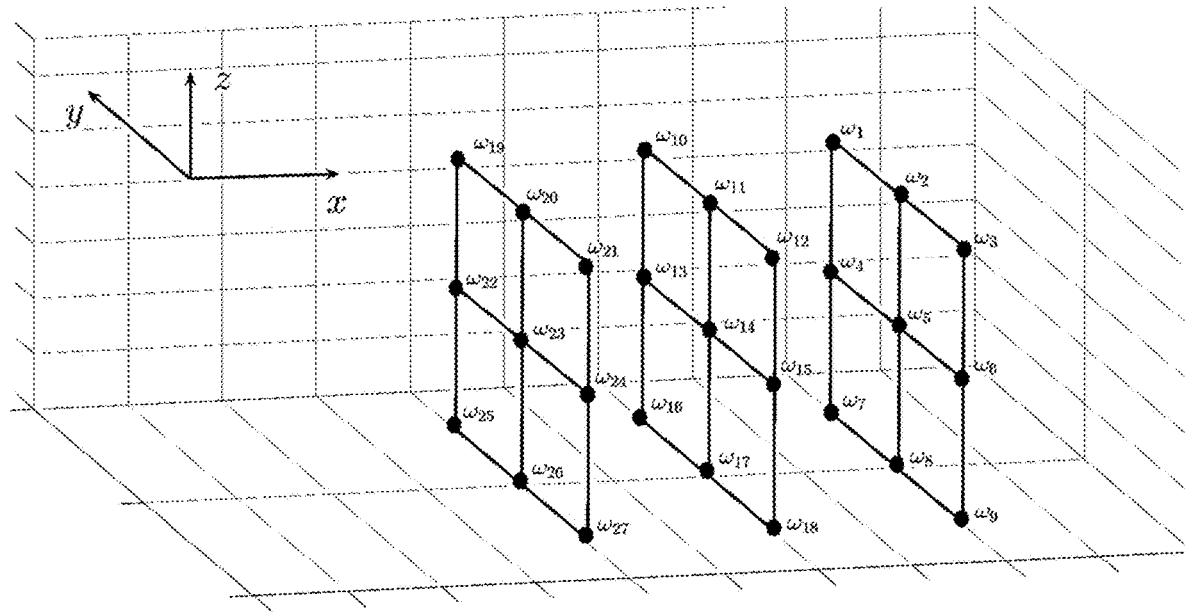
FIG. 4 is a perspective view of the space grid according to the invention.

In this first step, the space upstream from the LiDAR sensor is defined with a grid as shown in FIGS. 1, 3 and 4. A coordinate system wherein the LiDAR performs measurements is defined in this step. The coordinate system defined is the right-handed trihedron illustrated in FIGS. 1 and 3. The origins x-y of this system are at the level of the position of the LiDAR on nacelle 3 and origin z is at ground level 6.

Axis x points horizontally in the direction of the wind, axis z points vertically upwards and axis y is perpendicular to form a right-handed three-dimensional coordinate system (satisfying the right-hand rule).

In this step, the space grid comprises a set of discretized points located upstream, which define a three-dimensional grid. For each distance x set, plane y-z is divided into non-overlapping cells, as can be seen in FIG. 3. The grid comprises wind speed measurement points (PM) and estimation points (PE).

In connection with this space grid, underlying variables, that is optimization variables, necessary for the estimation step described below are also defined. In order to enable smart and efficient implementation of the optimization algorithm described hereafter, all the optimization variables are grouped into an ordered vector denoted by w. The order determined for these optimization variables is a crucial engineering element for the feasibility and the performance of a coding algorithm of this method.

A vector ω is defined for each point of the discretized space and it is made up of all the components $v_x$ of the points (PE) in the space where the wind is estimated, respectively followed by the components $v_y$ and $v_z$. Estimation of the wind speed at n points involves constructing a vector co of size 3n, with $W_1$ to $W_n$ containing all the $v_x$, $W_{n+1}$ to $W_{2n}$ containing all the $v_y$ and $W_{2n+1}$ to $W_{3n}$ containing all the $v_z$.

The following example is given for components $v_x$ of the wind speed, it being understood that the method is identical for $v_y$ and $v_z$. As has been done in the initial step, and as can be seen in FIG. 3, the space is discretized into x, y and z with $n_x$ points at x, $n_y$ points at y and $n_z$ points at z.

In this configuration:

$$n = n_x n_y n_z$$

Wind speed component $v_x$ whose coordinate is $(x_i, y_j, z_k)$ is defined by $V_{i,j,k}$. The subscript l of $W_l$ containing the corresponding estimation is obtained as follows:

$$l = (n_x - i) n_y n_z + (k-1) n_y + j$$

For example, if $i = n_x$, $k=1$ and $j=1$, then:

$$l = (n_x - i) n_y n_z + (k-1) n_y + j = 1$$

This corresponds to the upper left corner of the estimation domain, at the furthest distance upstream from the rotor plane, as illustrated in FIG. 4.

2. Measuring (MES) the Wind Amplitude and Direction at Different Measurement points Secondly, the LiDAR sensor performs a measurement m(t) relative to the wind speed at a measurement point (PM) located upstream from wind turbine 1. This measurement m(t) corresponds to the signal received by the sensor from measurement point (PM) in response to the signal emitted by the LiDAR sensor. Indeed, by interferometry and Doppler effect, part of the laser signal emitted by the LiDAR sensor is reflected by the air molecules at the measurement point and also by the aerosols (suspended dust particles and microparticles). The measurement point is defined by the characteristics of the LiDAR sensor, notably the focal length, and by its orientation. This measurement, dependent on the wind speed, is a time and it depends on the orientation of the LiDAR sensor.

For the case of the pulsed LiDAR, the measurements are obtained successively according to the grid defined in the previous step, starting with the longitudinal beam b0, then the oblique beam b1, and finally beam b4. An interesting characteristic of this system is that it allows measuring the projection of the wind speed at several distances, simultaneously, for a given beam. It is thus possible to obtain for example 10 successive distances between 50 m and 400 m, at a sampling rate of 0.25 Hz or 1 Hz. It is of course possible to limit oneself to two measurements, which are sufficient to reconstruct a model in three dimensions. At each sampling time, only the measurements of the selected current beam are refreshed.

In a particular case, according to FIG. 4, the measurements are performed at seven distances and notably at x=[50 80 120 160 200 240 280] m for the five beams. Thus, for each fixed x, plane y-z is divided into cells as follows:

The first four points (PM) correspond to coordinates y-z of the measurement points for beams 1, 2, 3, 4 of distance x=280 m.

The four second points (PM1) correspond to coordinates y-z of the measurement points for beams 1, 2, 3, 4 of distance x=240 m.

The four third points (PM2) correspond to coordinates y-z of the measurement points for beams 1, 2, 3, 4 of distance x=200 m.

The four fourth points (PM3) correspond to coordinates y-z of the measurement points for beams 1, 2, 3, 4 of distance x=160 m.

The four fifth points (PM4) correspond to coordinates y-z of the measurement points for beams 1, 2, 3, 4 of distance x=120 m.

The four sixth points (PM5) correspond to coordinates y-z of the measurement points for beams 1, 2, 3, 4 of distance x=80 m.

The four seventh points (PM6) correspond to coordinates y-z of the measurement points for beams 1, 2, 3, 4 of distance x=50 m.

The central point (PM7) corresponds to coordinates y-z of the measurement points for beam 0 for all the distances.

The measurements m(k) of the LiDAR for beams j=0, 1, 2, 3, 4 at the distance x meters and at the time k are given by the formula mj, x(k), with j=0, 1, 2, 3, 4.

For example, $m_{0,50}(1)$ is the LiDAR measurement for beam j=0 at the distance x=50 meters and at the instantaneous time k=1. Within the context of the invention, the LiDAR measurement is then given by a formula of the type:

$$m_{j,x}(k) = a_j v_{j,x}(k) + b_j v_{j,y}(k) + c_j v_{j,z}(k)$$

where $v_{j,x}(k)$, $v_{j,y}(k)$, $v_{j,z}(k)$ are wind speed values projected onto a given coordinate system at the initial time (k), and $a_j$, $b_j$, $c_j$, with j=0, 1, 2, 3, 4, are measurement coefficients, which are given as:

$$\begin{cases} a_j = \cos(\theta_j), \\ b_j = \sin(\theta_j)\cos(\varphi_j), \\ c_j = \sin(\theta_j)\sin(\varphi_j) \end{cases}$$

where $\theta_j, \varphi_j$, with j=0, 1, 2, 3, 4, are respectively the zenith and the azimuth of the measurement axis in a spherical coordinate system.

The advantage of defining the LiDAR measurement equation in the previously defined coordinate system, with the selected spatial discretization, is that it can be used directly since the coordinates of the measurement point coincide with a particular point of the discretized space.

3. Estimating (EST) the Wind Amplitude and Direction at any Time (t) at all the Discretized Points This step obtains a value for the wind at the estimation points (PE) of the grid.

Estimation is therefore achieved by use of the optimization by a weighted recursive least-squares method of a cost function using the measured LiDAR data m(k), as well as wind speed spatial coherence data, wind speed temporal variation data, and data qualifying the quality of the measurements m(k) performed at the measurement points, which is described hereafter.

Taking account of the temporal coherence allows quantifying the "resemblance" of the wind field estimation at a date t to the wind field estimation made at an earlier date (t−1, t−2, . . . ).

Carrying out the weighted recursive least-squares minimization of the cost function by integrating the temporal coherence corresponds to the implementation of an extended Kalman filter.

$$\omega(t) = \omega(t-1) + K(y(t) - C\omega(t-1))$$

The advantage of this approach is the capacity to consider updating the estimation of the wind field at a date t even if the measurements acquired at the date t are not valid or reliable. This is done based on the wind field estimation obtained at an earlier date (t−1, t−2, . . . ). Thus, by extension, the reconstruction of the wind field is robust against the unavailability of data of the acquisition device, over a limited time period related to the temporal coherence limit of the estimation. A direct implementation of this solution is the setting up of a buffer memory region, commonly referred to as buffer, containing the last valid measurements of each beam, at each distance from the LiDAR. This buffer thus is the source of input data for the reconstruction algorithm.

For example, for a 4-beam pulsed device, acquiring over 10 distances, the buffer will have 4*10 places where the last 40 valid acquired radial measurements will be stored. Thus, indicators such as the spatial wind speed average at a given distance will be stabilized and made reliable by the availability, at each acquisition date, of all the measurements, whether current, retarded or estimated. Indeed, it is a known fact that not considering all of the beams to establish a spatial wind indicator leads to erroneous values for spatial averages, in particular when wind shear occurs, or when the acquisition device is misaligned with respect to the predominant wind direction.

It is also necessary to provide a dating or an obsolescence indicator for the stored data so as to be able to determine the relevance thereof as the information source for updating the wind field estimation. This relevance depends on the temporal coherence of the estimated phenomenon, that is the wind field spreading towards the wind turbine where the LiDAR is positioned. The temporal coherence of the wind can be a setting parameter, or it may originate from a wind model.

Robust exploitation of the described approach in the patent requires providing a confidence index or interval, together with the wind field estimation and the associated descriptive quantities, at any time. The descriptive quantities of the wind field can be, for example: the horizontal and vertical amplitude and directional wind shears, the average speed and direction at each measurement distance, the turbulence intensity, etc.

This confidence interval is constructed from an equation taking into account:
- the number of valid measurements at the current acquisition date;
- the date of the last valid measurements, if the last acquisitions obtained are not all reliable; and
- the confidence interval intrinsic to the reconstruction algorithm. This confidence interval depends on the variance deduced from the estimation process. In the case of a implementation using a Kalman filter, it can be the values of the covariance matrix of the modelled process.

These considerations allow synthesis in a robust and reliable manner of an uncertainty to be associated with the wind field reconstruction, which integrates the availability and the obsolescence of the measurements with the intrinsic confidence index of the estimator.

This uncertainty can be provided with the measurement and equated to the standard global deviation of the estimation. This quantity is a very relevant piece of information for reconstruction exploitation in a real-time diagnosis or LiDAR-assisted wind turbine control context.

3.1 Spatial Differences

These subsections define the wind spatial coherence data within the scope of the invention, and more particularly within the context of a LiDAR mounted on nacelle 3 of a wind turbine 1.

In this step, the wind speed components on axes x, y and z of the coordinate system defined above are considered.

In this estimation step, it is admitted that the wind speed changes relatively little in space and that the wind has a high spatial coherence in a small volume of space. The presentation below is given for components $v_x$, that is for the first n variables of $\omega$ with an estimation domain shown in FIG. 4 (the approach is similar for components $v_y$ and $v_z$) and by taking $n_x=n_y=n_z=3$.

3.1.1 Longitudinal Difference

The longitudinal difference corresponds to the change of $v_x$ along axis x and it changes slowly according to the invention. In this case, the partial derivative $dv_x/dx$ is relatively small. In other words:

$$\begin{cases} \omega_1 - \omega_{10} \approx 0 \\ \omega_2 - \omega_{11} \approx 0 \\ \vdots \\ \omega_{18} - \omega_{27} \approx 0 \end{cases}$$

The previous equation can be written in a compact vector form as follows:

$$C_{xl}\omega \approx 0$$

where $$C_{xl} = \begin{bmatrix} +1 & 0 & \cdots & 0 & -1 & 0 & \cdots & 0 \\ 0 & +1 & \cdots & 0 & 0 & -1 & \cdots & 0 \\ \vdots & \vdots & \ddots & \vdots & \vdots & \vdots & \ddots & \vdots \\ 0 & 0 & \cdots & +1 & 0 & 0 & \cdots & -1 \end{bmatrix}$$

It is noted that each row of $C_{xl}$ contains a +1 and a −1.

Similarly, the variation of $v_y$ and $v_z$ along the longitudinal axis can be calculated as:

$$\begin{cases} C_{yl}\omega \approx 0, \\ C_{zl}\omega \approx 0 \end{cases}$$

where $C_{yl}$, $C_{zl}$ are coefficient matrices containing only one +1 and one −1 in each row.

By defining:

$$C_l = \begin{bmatrix} C_{xl} \\ C_{yl} \\ C_{zl} \end{bmatrix}$$

the equation is obtained:

$$C_l\omega \approx 0$$

that characterizes the wind speed variation for the estimation domain along the longitudinal axis.

3.1.2 Lateral Difference

The lateral difference is the change of $v_x$ along axis y. Similarly, since the wind changes smoothly, partial derivative $dv_x/dy$ is relatively small. In other words:

$$\begin{cases} \omega_1 - \omega_2 \approx 0 \\ \omega_2 - \omega_3 \approx 0 \\ \vdots \\ \omega_{26} - \omega_{27} \approx 0 \end{cases}$$

The previous equation can be written in a compact vector form:

$$C_{xt}\omega \approx 0$$

where $$C_{xt} = \begin{bmatrix} +1 & -1 & 0 & \cdots & 0 & 0 & 0 & \cdots & 0 & 0 \\ 0 & +1 & -1 & \cdots & 0 & 0 & 0 & \cdots & 0 & 0 \\ \vdots & \vdots & \vdots & \ddots & \vdots & \vdots & \vdots & \ddots & \vdots & \vdots \\ 0 & 0 & 0 & \cdots & 0 & 0 & 0 & \cdots & +1 & -1 \end{bmatrix}$$

Each row of $C_{xt}$ contains a +1 and a −1.

Similarly, the variation of $v_y$ and $v_z$ along the lateral axis can be calculated as:

$$\begin{cases} C_{yt}\omega \approx 0, \\ C_{zt}\omega \approx 0 \end{cases}$$

where $C_{yt}$, $C_{zt}$ are coefficient matrices containing only one +1 and one −1 in each row.

By defining:

$$C_t = \begin{bmatrix} C_{xt} \\ C_{yt} \\ C_{zt} \end{bmatrix}$$

it is clear that the equation:

$$C_l\omega \approx 0$$

characterizes the wind speed variation for the estimation domain along the lateral axis.

3.1.3 Vertical Difference

The vertical profile of the wind speed is given by a power law, which allows obtaining a description of the wind speed component $v_x$ at different heights that is much more accurate.

The vertical profile of the wind speed describes the evolution of the longitudinal wind speed as a function of the height above ground level. The power law of the wind speed profile is generally used to estimate the longitudinal wind speed $v_l$ at a height above ground level z, considering the longitudinal wind speed $v_{lr}$ at a reference height $z_r$, using the equation:

$$v_l = v_{lr}\left(\frac{z}{z_r}\right)^\alpha$$

where $\alpha$ is the power law exponent, which is generally given as a function of stability.

The constant value $\alpha=1/7$ is commonly used, in coherence with a relatively low wind shear assumption. However, it is noted that considering a to be constant amounts to disregarding the ground surface roughness, interactions between the wind and possible obstacles, and the stability of the atmosphere.

By using this power law, a vertical wind difference is given by:

$$\begin{cases} \omega_1 - \left(\frac{z_1}{z_4}\right)^\alpha \omega_4 \approx 0 \\ \omega_2 - \left(\frac{z_2}{z_5}\right)^\alpha \omega_5 \approx 0 \\ \vdots \\ \omega_{24} - \left(\frac{z_{24}}{z_{27}}\right)^\alpha \omega_{27} \approx 0 \end{cases}$$

where $z_j$ is the height of w and a is the power law exponent, assumed to be 1/7.

The previous equation can be written in a compact vector form as follows:

$$C_{xv}\omega \approx 0$$

where $$C_{xv} = \begin{bmatrix} +1 & 0 & 0 & -\left(\frac{z_1}{z_4}\right)^\alpha & 0 & 0 & \cdots & 0 & 0 & 0 & 0 \\ 0 & +1 & 0 & 0 & -\left(\frac{z_2}{z_5}\right)^\alpha & 0 & \cdots & 0 & 0 & 0 & 0 \\ \vdots & \vdots & \vdots & \vdots & \vdots & \vdots & \ddots & \vdots & \ddots & \vdots & \vdots \\ 0 & 0 & 0 & 0 & 0 & 0 & \cdots & +1 & 0 & 0 & -\left(\frac{z_{24}}{z_{27}}\right)^\alpha \end{bmatrix}$$

Similarly, the variation of $v_y$ and $v_z$ along the vertical axis can be quantified as:

$$\begin{cases} C_{yv}\omega \approx 0, \\ C_{zv}\omega \approx 0 \end{cases}$$

However, since the wind profile power law only applies to the longitudinal wind speed, $C_{yv}$, $C_{zv}$ contain only one +1 and one −1 in each row.

By defining:

$$C_v = \begin{bmatrix} C_{xv} \\ C_{yv} \\ C_{zv} \end{bmatrix}$$

the equation is obtained:

$$C_v\omega \approx 0$$

which characterizes the wind speed variation for the estimation domain along the vertical axis.

Finally, by using:

$$C_l\omega \approx 0$$

and $$C_t\omega \approx 0$$

it is obtained:

$$\begin{cases} C_l\omega \approx 0, \\ C_t\omega \approx 0, \\ C_v\omega \approx 0 \end{cases}$$

or, in an equivalent manner:

$$C_s\omega \approx 0$$

which is the equation characterizing the total wind speed variation along axis x, y and z with:

$$C_s = \begin{bmatrix} C_l \\ C_t \\ C_v \end{bmatrix}$$

3.2 LiDAR Measurements

For the purpose of the calculation, it is important to rewrite the measurement equation in vector form of w. In the previous example of a five-beam LiDAR and for seven measurements per beam, when j=0, 1, 2, 3, 4, and x=[50, 80, 120, 160, 200, 240, 280], $$\begin{cases} v_{j,x} = [0 \ \ldots \ 0 \ 1 \ 0 \ \ldots \ 0]\omega = C_{j,xx}\omega \\ v_{j,y} = [0 \ \ldots \ 0 \ 1 \ 0 \ \ldots \ 0]\omega = C_{j,xy}\omega \\ v_{j,z} = [0 \ \ldots \ 0 \ 1 \ 0 \ \ldots \ 0]\omega = C_{j,xz}\omega \end{cases}$$

By combining with:

$$m_{j,x}(k) = a_j v_{j,x}(k) + b_j v_{j,y}(k) + c_j v_{j,z}(k)$$

it is obtained:

$$m_{j,x} = c_{j,x}\omega$$

where $$C_{j,x} = [a_j \ b_j \ c_j] \begin{bmatrix} C_{j,xx} \\ C_{j,xy} \\ C_{j,xz} \end{bmatrix}$$

that can be rewritten in compact vector form:

$$C_m \omega = m_m$$

where $$m_m = \begin{bmatrix} m_{0,50} \\ m_{1,50} \\ \vdots \\ m_{4,280} \end{bmatrix}, C_m = \begin{bmatrix} C_{0,50} \\ C_{1,50} \\ \vdots \\ C_{4,280} \end{bmatrix}$$

To take account of the measurement noises, a more realistic model for the LiDAR measurements can be introduced as follows:

$$C_m \omega = m_m + \epsilon_m$$

where $\epsilon_m$ describes the measurement noises.

3.3 the Weighted Recursive Least-Squares Method

It is known that the wind speed changes very little, not only in space but also in time. We provide hereafter means for accounting for this information in the optimization approach. $\hat{\omega}(0)$ is the estimation of the wind speed at the time 0. At any time, the optimization problem is as follows:

$$\min_{\omega(t)} J(t)$$

with $$J(t) = (\omega(0) - \hat{\omega}(0))^T P_0^{-1}(\omega(0) - \hat{\omega}(0)) +$$

$$\sum_{j=1}^{t}(\omega(j) - \omega(j-1))^T Q^{-1}(\omega(j) - \omega(j-1)) + +$$

$$\sum_{j=1}^{t}\omega(j)^T C_s^T R_s^{-1} C_s \omega(j) + \sum_{j=1}^{t}(C_m \omega(j) - m_m)^T R_m^{-1}(C_m \omega(j) - m_m(j))$$

There are four terms in the previous cost function:
the first term reduces the knowledge of the initial wind speed $\omega(0)$;
the second term reduces the wind speed variation in time;
the third term reduces the wind speed variation in space; and
the fourth term penalizes reduces the LiDAR measurement quality.

By using the previous formula, a clear interpretation of weighting matrices $P_0$, Q, $R_s$ and Rm is obtained. Thus:
if the wind speed $\omega(t)$ at the time t=0 is known, then $\omega(0) = \hat{\omega}(0)$, then $P_0$ is small. Otherwise, $P_0$ is large;
if there are many wind speed variations in time, then Q is large. Otherwise, Q is small;
if the wind speed changes rapidly, then $R_s$ is large. Otherwise, $R_s$ is small; and
if there is substantial noise in the LiDAR measurements, then $R_m$ is large. Otherwise, $R_m$ is small.

If the following three limitative cases are considered:
There is no information on the initial wind speed available. Therefore, $P_0$ is very large. The term:

$$(\omega(0) - \hat{\omega}(0))^T P_0^{-1}(\omega(0) - \hat{\omega}(0))$$

can thus be disregarded in the cost function.
There is no relation between the wind speed at the time t and the wind speed at the time t−1.
In this case, Q can be selected very large. The following term can be disregarded:

$$\sum_{j=1}^{t}(\omega(j) - \omega(j-1))^T Q^{-1}(\omega(j) - \omega(j-1))$$

the wind speed variation in space is very low. In this case, $R_s$ can be selected to be very small. The following term is important in the cost function:

$$\sum_{j=1}^{t}\omega(j)^T C_s^T R_s^{-1} C_s \omega(j).$$

It is defined:

$$C = \begin{bmatrix} C_s \\ C_m \end{bmatrix}, R = \begin{bmatrix} R_s & 0 \\ 0 & R_m \end{bmatrix}$$

The weighted recursive least-squares method is used to solve the optimization problem as follows:
the optimization variables are initialized as follows:

$$\begin{cases} \omega(0) = \hat{\omega}(0), \\ P(0) = P_0 \end{cases}$$

at any time t:
It is defined:

$$y(t) = \begin{bmatrix} 0 \\ y_m(t) \end{bmatrix}$$

where 0 is a zero vector of suitable dimension
an auxiliary matrix K is calculated such that:

$$K = (P(t-1)+Q)C(C^T(P(t-1)+Q)C+R)^{-1}$$

the matrix P(t) is calculated such that:

$$P(t) = (I-KC)P(t-1)$$

where I is an identity matrix of suitable dimension the wind speed at the time t is then estimated as follows:

$$\omega(t) = \omega(t-1) + K(y(t) - C\omega(t-1))$$

4. Reconstruction of the Incident Wind Field in Three Dimensions (3D) and in Real Time In this step, a processor is integrated in the LiDAR sensor collects all the wind amplitude and direction data measured and estimated during the previous steps. Data recovery is performed in real time for each previously defined measurement point (PM) and estimation point (PE). Thus, the LiDAR sensor can reconstruct the entire incident wind field on the LiDAR as can be seen in FIG. 5.

Figure 5:
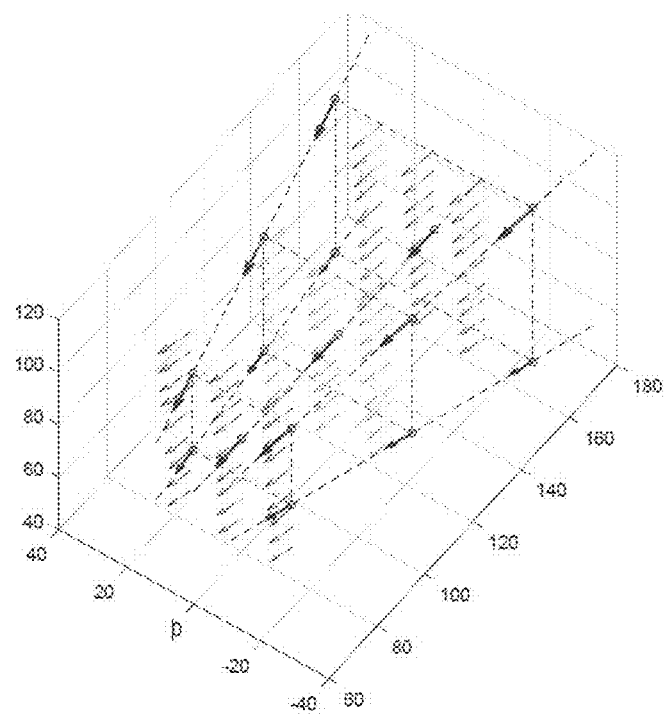
FIG. 5 illustrates a wind field in 3D reconstructed from LiDAR measurements in a particular case.

Also in FIG. 5, a reconstructed wind field is shown for a time at 68 seconds. The y-axis represents the height above ground (in m) and the x-axis represents the distance to the nacelle (in m) and the lateral relative positions with respect to the LiDAR (in m).

The invention further relates to a method of at least one of controlling and monitoring a wind turbine equipped with a LiDAR sensor as described above and an associated PLC 10, the method comprising the following steps:

a) developing a feed-forward control strategy (CON) for the wind turbine 1 by exploiting the reconstruction of the incident wind field in three dimensions and in real time obtained by the method according to the invention;

b) controlling (PIL) including the developed control strategy that controls the angle of blades 7 or the orientation of nacelle 3.

Figure 6:
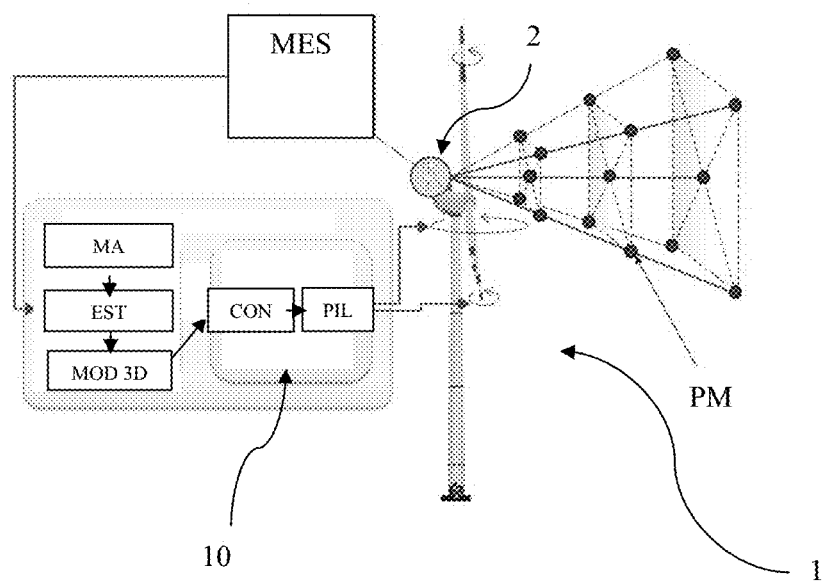
FIG. 6 illustrates the steps of the wind turbine control method according to the invention.

FIG. 6 shows the overall operation of such a wind turbine 1. Wind turbine 1 therefore comprises a LiDAR sensor 2 according to the invention and its processing unit, a computing device including a software solution for 3D reconstruction of the wind field, a PLC integrating the control strategy and a device for controlling at least one of the blades and the nacelle of the wind turbine. In connection with FIG. 6, the invention which is applied to a wind turbine operates as follows:

first, the LiDAR carries out the step of incident wind field acquisition and modelling as described above, to reconstruct a 3D incident wind field (steps ME, MA, EST, MOD 3D of FIG. 6), second, PLC 10 develops the control strategy (CON) and performs control (PIL) of the elements of wind turbine 1 by accounting for the developed control strategy.

This method according to the invention allows real-time analysis of the incident wind or detection of gusts, power curves and turbulence intensities, which can be used to regulate or supervise the wind turbine to obtain a better wind turbine alignment, leading to production optimization and to load and fatigue minimization.

The invention claimed is:

1. A method for incident wind field acquisition and modelling by a LiDAR sensor in a space located upstream from the LiDAR sensor, wherein the method comprises steps of:

a) gridding the space located upstream from the LiDAR sensor where gridding of the space is carried out with a set of discretized points positioned in a predetermined three-dimensional grid comprised of a set of cells made up of estimation points and measurement points;

b) measuring the amplitude and direction of the wind at the different measurement points located in the space located upstream and positioned at least at two distances from the LiDAR sensor, along at least three measurement axes;

c) estimating the wind amplitude and direction at any time on all of the estimation points by optimization using a weighted recursive least-squares method of a cost function that uses at least data from measurement points, wind speed spatial coherence data, wind speed temporal coherence data, and data qualifying a quality of the measurements performed at the measurement points; and d) reconstructing, in real time and in a predetermined coordinate system, the incident wind field in three dimensions (3D) from the estimated and measured wind amplitudes and directions for each point of the grid; and wherein measurement m of amplitude and direction of the wind at a measurement point is given by a relationship expressed by:

$$m_{j,x}(k)=a_j v_{j,x}(k)+b_j v_{j,y}(k)+c_j v_{j,z}(k)$$

where $v_{j,x}(k)$, $v_{j,y}(k)$, $v_{j,z}(k)$ are values of the wind speed projected onto a given coordinate system x, y, z at an initial time (k), and $a_j$, $b_j$, $c_j$ with j=0, 1, 2, 3, 4 are measurement coefficients that are expressed as:

$$\begin{cases} a_j = \cos(\theta_j), \\ b_j = \sin(\theta_j)\cos(\varphi_j), \\ c_j = \sin(\theta_j)\sin(\varphi_j) \end{cases}$$

where θj,φj are zenith and azimuth of the measurement axis respectively in a spherical coordinate system.

2. A method as claimed in claim 1, wherein cost function J at any time (t) is written as follows:

$$J(t) = (\omega(0) - \hat{\omega}(0))^T P_0^{-1}(\omega(0) - \hat{\omega}(0)) + \sum_{j=1}^{t}(\omega(j) - \omega(j-1))^T Q^{-1}(\omega(j) - \omega(j-1)) + + \sum_{j=1}^{t}\omega(j)^T C_s^T R_s^{-1} C_s \omega(j) + \sum_{j=1}^{t}(C_m \omega(j) - m_m)^T R_m^{-1}(C_m \omega(j) - m_m(j))$$

where ω is an ordered vector comprised of all components of speed at points in space where wind is estimated, $\hat{\omega}(0)$ is an estimation of the wind speed at time 0, $P_0$, Q, $R_s$ and $R_m$ are weighting matrices, and $C_s$, $C_m$ are matrices accounting for the wind speed and measurement noise.

3. A method as claimed in claim 1, wherein wind amplitude and direction measurements at different measurement points are carried out at a sampling rate of at least 0.25 Hz.

4. A method as claimed in claim 1, wherein wind amplitude and direction measurements at different measurement points are performed at least at two different distances along a measurement axis.

5. A method as claimed in claim 1, wherein wind amplitude and direction measurements are performed along at least three measurement axes.

6. A method as claimed in claim 1, wherein spatial coherence of wind speed along axes x, y and z of a Cartesian coordinate system is estimated with a formula:

$$C_s \omega \approx 0$$

with:

$$C_s = \begin{bmatrix} C_l \\ C_t \\ C_v \end{bmatrix}$$

where:
$C_l$ characterizes wind speed variation for an estimation domain along longitudinal axis x;
$C_t$ characterizes wind speed variation for an estimation domain along lateral axis y;

$C_v$ characterizes wind speed variation for an estimation domain along vertical axis z; and vector ω is an ordered vector comprised of all components of the wind speed at the points in space where the wind is estimated.

7. A method as claimed in claim 6, wherein the spatial coherence of the wind speed along axes x, y and z of the Cartesian coordinate system is estimated by:

wind speed variation along the longitudinal axis x and a partial derivative $dv_x/dx$ is along the longitudinal axis;

wind changes along lateral axis y and partial derivative $dv_x/dx$ is along lateral axis; and wind speed changes with a power law along vertical axis z given by:

$$v_l = v_{l_r}\left(\frac{z}{z_r}\right)^\alpha$$

where α is a power law exponent, $v_l$ is a longitudinal wind at height Z above ground and $Z_r$ is a reference height.

8. A method as claimed in claim 1, wherein quality of the measurements performed by the LiDAR sensor is represented by a model as follows:

$$C_m\omega = m_m + \in_m$$

where $\in_m$ describes measurement noise.

9. A method as claimed in claim 1, wherein estimation of the wind field amplitude and direction at a time over all of the estimation points is given by the formula as follows:

$$\omega(t) = \omega(t-1) + K(y(t) - C\omega(t-1)).$$

10. A computer program product, comprising code instructions which carry out steps of claim 1, when the program is executed on a processing unit of the LiDAR sensor.

11. A LiDAR sensor, comprising a memory in which are stored code instructions of a computer program product as claimed in claim 10, designed to execute the code instructions.

12. A wind turbine comprising a LiDAR sensor as claimed in claim 11.

13. A wind turbine as claimed in claim 12, wherein the LiDAR sensor is located on a nacelle of the wind turbine.

14. A method of controlling and monitoring at least one wind turbine equipped with a LiDAR sensor and a PLC, comprising:

a) developing a feed-forward control strategy for the wind turbine by exploiting reconstruction of an incident wind field in three dimensions and in real time obtained with a method of incident wind field acquisition and modelling by a LiDAR sensor as claimed in claim 1; and b) developing a control strategy which controls an angle of blades or orientation of a nacelle.

* * * * *